United States Patent [19]

McDougal

[11] Patent Number: 4,517,540

[45] Date of Patent: May 14, 1985

[54] SPIRAL WINDINGS

[76] Inventor: John A. McDougal, 14388 Harbor Island, Detroit, Mich. 48215

[21] Appl. No.: 135,188

[22] Filed: Mar. 28, 1980

Related U.S. Application Data

[63] Continuation of Ser. No. 796,533, May 13, 1977, abandoned.

[51] Int. Cl.³ .............................................. H01F 27/30
[52] U.S. Cl. .................................... 336/205; 336/107; 336/198; 336/206; 336/232
[58] Field of Search ................... 336/200, 232, 83, 96, 336/107, 206, 136, 198, 208, 65, 205, 180; 123/634, 621

[56] References Cited

U.S. PATENT DOCUMENTS

| 995,400 | 6/1911 | Cavanagh | 336/107 X |
|---|---|---|---|
| 1,011,884 | 12/1911 | Cavanagh | 336/107 X |
| 1,134,840 | 4/1915 | Goldthrop | 336/232 X |
| 1,647,474 | 11/1927 | Seymour | 336/200 X |
| 2,014,524 | 9/1935 | Franz | 336/200 |
| 2,768,357 | 10/1956 | Lyons | 336/232 X |
| 2,911,605 | 11/1959 | Wales, Jr. | 336/200 |
| 2,967,238 | 1/1961 | Frey | 336/232 X |
| 3,058,078 | 10/1962 | Hoh | 336/232 X |
| 3,089,106 | 5/1963 | Saaty | 336/232 X |
| 3,139,566 | 6/1964 | Marley | 336/200 |
| 3,278,877 | 10/1966 | Kameya et al. | 336/136 |
| 3,560,904 | 2/1971 | Wilkes | 336/200 X |

FOREIGN PATENT DOCUMENTS

| 143116 | 9/1948 | Australia | 336/200 |
|---|---|---|---|
| 260478 | 3/1964 | Australia | 336/83 |
| 906831 | 3/1954 | Fed. Rep. of Germany | 336/200 |
| 1462251 | 1/1969 | Fed. Rep. of Germany | 336/208 |
| 2409881 | 4/1975 | Fed. Rep. of Germany | 336/83 |
| 1098261 | 7/1955 | France | 336/180 |
| 1185354 | 7/1959 | France | 336/200 |
| 772528 | 4/1957 | United Kingdom | 336/200 |
| 1180923 | 2/1970 | United Kingdom | 336/83 |

Primary Examiner—Thomas J. Kozma
Attorney, Agent, or Firm—Harness, Dickey & Pierce

[57] ABSTRACT

Several embodiments of coil assemblies suitable for a variety of uses are disclosed herein all of which employ spiral windings which minimizes coil layer-to-layer voltage gradients to levels which conventional enamel wire insulation is able to withstand. In one embodiment a spiral winding is fabricated in strip form using a continuous strand of wire secured to a continuous ribbon-like substrate by an adhesive composition which may be provided on the wire so as to form a plurality of spiral windings on segments or portions of the substrate, each winding having one turn in each radial layer. The substrate will include other segments located between each winding portion to provide insulating means for the spiral windings and for the transition of the wire as it passes to the next successive winding containing segment. These spiral windings may be fabricated in elongated strips and coiled for storage upon a cylindrical spool or the like, so as to allow any desired number of winding and insulating segments to be subsequently selected and folded in such a manner as to place an insulation segment between each winding portion which may then be impregnated with an epoxy composition. These spiral windings are particularly suitable for use with such improved core structures as the highly efficient ferrite "pot" core types wherein several hundred volts per turn may be developed.

19 Claims, 24 Drawing Figures

SPIRAL WINDINGS

This is a continuation, of application Ser. No. 796,533, filed May 13, 1977 now abandoned.

BACKGROUND AND SUMMARY OF THE INVENTION

The present invention relates to electrical coil constructions and, more particularly, to spiral type coil constructions which may be directly wound on a suitable bobbin or fabricated on a substrate in a continuous strip form and provide substantially improved voltage gradient characteristics. This invention is related to the invention disclosed in applicant's application Ser. No. 384,469, filed Aug. 1, 1973, now abandoned in favor of applicant's copending application Ser. No. 549,717, filed Feb. 13, 1975 for "Ignition Coil", now abandoned in favor of application Ser. No. 894,449, filed Apr. 7, 1978 which is a continuation thereof.

Conventional ignition coils generally comprise a core material capable of conducting magnetic flux, such as a soft iron or other similar material, a primary winding and secondary winding, each of which is disposed over the core material. These coils are generally constructed with the secondary winding formed by wrapping successive helical layers of an electrical conductor over the core material or other forming structure until the desired number of turns is established. Typically, each helical layer of such a construction will consist of several turns of the electrical conductor laid side by side extending longitudinally along the core material with the next layer beginning at the opposite end and travelling longitudinally back over the first layer. The electrical conductor normally used is commonly referred to as magnet wire and is a small gauge copper wire generally insulated with a coating of enamel or other like material thereon. In operation, each turn of the secondary coil winding will have induced in it a voltage produced by the changing magnetic field which links that turn and which is generated by changes in the current flowing in the primary winding. This magnetic field will induce approximately an equal amount of voltage in each successive turn of the winding, but as the individual turns are all serially connected, the voltage of each turn will be added to that induced in each preceding turn. Thus, it becomes apparent that while the turn-to-turn voltage gradient within the coil may be small, as the total number of turns within each layer increases, the layer-to-layer voltage gradient, being composed of the sum of the turn-to-turn voltage gradients within each layer of two adjacent radially disposed layers, will be of a considerable magnitude. This is particularly true when successive layers are wound with alternating longitudinal travel, that is, the first layer is wound with successive turns travelling from right to left with the next layer having successive turns travelling longitudinally from left to right. In this construction, the layer-to-layer voltage at the beginning end of the winding will be the sum of the turn-to-turn voltage gradients for two complete layers of winding.

In order to prevent these large voltage gradients from breaking down the enamel or like insulation and thereby shorting out entire layers of windings, it is common practice to introduce additional interlayer insulation. The dielectric constant of these materials in combination with the relatively large surface area of the thousands of turns of secondary winding typically found in a high voltage winding produces large distributed capacitance. This distributed capacitance must be charged each time the winding is energized and discharged each time the winding is de-energized, thus introducing substantial limitations on the speed with which this energization and de-energization may be accomplished. The addition of this interlayer insulation increases the bulk of the coil itself further resulting in increased cost of the final product.

The development of new ferrite compositions, which may be formed into structures, commonly referred to as "pot" cores, which allow a much greater rate of change of magnetic flux therein, have afforded opportunity to develop high voltage windings having only hundreds of turns instead of the thousands of turns required when they are wound on cores usually associated with conventional high voltage coil construction. These "pot" cores provide a relatively "tight" closed magnetic circuit and are readily capable of achieving an inductance of 1 Henry/1000 turns. With the capability of increasing the rate of change of magnetic flux, the voltage induced in each turn of the coil has been greatly increased to as high as several hundred volts per turn. Lack of reasonable and economical insulation systems now prevents widespread use of "tight" closed magnetic circuits in high voltage coils; most high voltage windings are now wound on relatively "open" magnetic cores and develop only from one to three volts per turn.

One solution to this problem has been to design a winding having spiralled turns, whereby each layer of the coil will consist of a single turn of the electrical conductor. Successive spiralled coils are then interconnected with suitable insulation provided therebetween to obtain the total number of turns for the desired coil application. While the basic concept of this form of construction solves the insulation problem such constructions have been extremely expensive to manufacture requiring successive spiral coils be separately manufactured and then interconnected. Further, these multiple connections decrease the reliability of the coil as the coil integrity will be only as good as the poorest of these connections. Should a single connection be less than perfect, it may decrease the coil output due to a high resistance therein or even become broken due to vibrations encountered by the coil during its use.

The present invention provides a solution to these problems through unique coil constructions employing a continuous electrical conductor which forms a plurality of axially spaced spiral windings on particular segments of a dielectric medium with other segments interspersed between the axially spaced winding so as to provide insulation both for the conductor interconnecting the spiral windings and for the axially spaced winding sections.

In one form the coil construction may be fabricated on a continuous flexible strip type dielectric medium by forming spiral windings on a plurality of winding segments thereof and providing insulating segments therebetween. The strip thus formed of the above described alternating segments may then be folded accordion style, thus forming a completed coil assembly which may then be fitted to a core along with a primary winding, thus completing a transformer.

In another embodiment, the spiral coil may be wound directly upon a bobbin fabricated from a plurality of nested washerlike elements. The use of this bobbin structure allows fabrication of a spirally wound coil using conventional coil winding machinery.

These spiral coil constructions thus provide means by which a high voltage coil may be fabricated at a cost significantly less than conventional high voltage coil constructions, while also providing a vastly improved insulation system which substantially eliminates the possibility of the insulation system breaking down due to a high layer-to-layer voltage gradient, particularly such as those encountered when such core materials are ferrite formed into "pot" cores, offering the faster rate of change of magnetic flux, are employed. A further advantage offered by the spiral windings of the present invention is that the number of turns in an ignition coil may be reduced by a factor of almost 100. For example, a 100 turn strip winding of #38 wire in a configuration capable of developing 200 volts per turn has a resistance of 17 Ohms. This contrasts with the hundred of Ohms resistance of conventional ignition coil secondary windings. Thus, a substantially greater fraction of ignition system input energy may be delivered to the spark plug gap rather than being lost in the resistance of the secondary winding. Further, the reduced secondary winding distributed capacitance mentioned previously is of great advantage in ignition coil applications as it permits faster rise time of the secondary voltage. Secondary voltage rise times to twenty kilovolts have been observed faster than two tenths of a microsecond and the limitation in this test was likely oscilloscope probe capacitance. As is well known, fast secondary voltage rise time is a measure of the capability of an ignition system to fire fouled, wet, or flooded spark plugs.

The spiral winding constructions of the present invention may be easily impregnated and encapsulated with an epoxy composition material so as to provide additional insulation therein and a protective layer therearound. Further, should it be desirable, this impregnation and encapsulation process may also be adapted to provide a molded structure ideally suited for accommodating a ferrite "pot" core. This combination may then be further encapsulated with additional structure to form a unitary ignition coil for spark ignited internal combustion engines which is adapted to mount on and has provisions for effecting an insulated high voltage electrical connection to a spark plug. Such a structure which may be adapted for use with this strip coil is disclosed in my copending application Ser. No. 549,717, entitled Ignition Coil and filed on Feb. 13, 1975.

Other advantages and features of the present invention will become apparent from the subsequent description and the appended claims taken in conjunction with the accompanying drawings.

DETAILED DESCRIPTION OF THE PREFERRED EMBODIMENT

Referring now to the drawings, there is shown a first embodiment of a spiral winding in accordance with the present invention in the form of a strip coil indicated generally at 10 having a portion 12 which is illustrated in a partially folded condition. Strip coil 10 is comprised of a substrate 14 in the shape of a continuous elongated relatively narrow ribbon-like material having irregularly shaped lateral edges. Substrate 14 may be fabricated from a wide variety of substances having a high dielectric strength, such as conventional insulating paper, Mylar, polyimide, or other similar flexible type material. Substrate strip 14 is divided into alternating winding segments 16 and insulating segments 18, each being identical in size and of a mirror image shape of its adjacent alternate segment. While each segment illustrated in FIG. 1 has two rounded corner portions 20 opposite each other with the remaining two corner portions being squared off, the particular shape illustrated is not unique and the substrate strip itself may be designed to any shape desired to accommodate a particular core structure or to meet any other design parameters which may be present in a particular application. It should be noted, however, that it will generally be desirable to provide tab portions extending outwardly from the central portion of each segment such as the squared off corner portions illustrated in FIG. 1 so as to provide increased insulation and support portions for leads attached to the coil windings.

Figures 1, 2, 3, 4, 5, 14, 15:
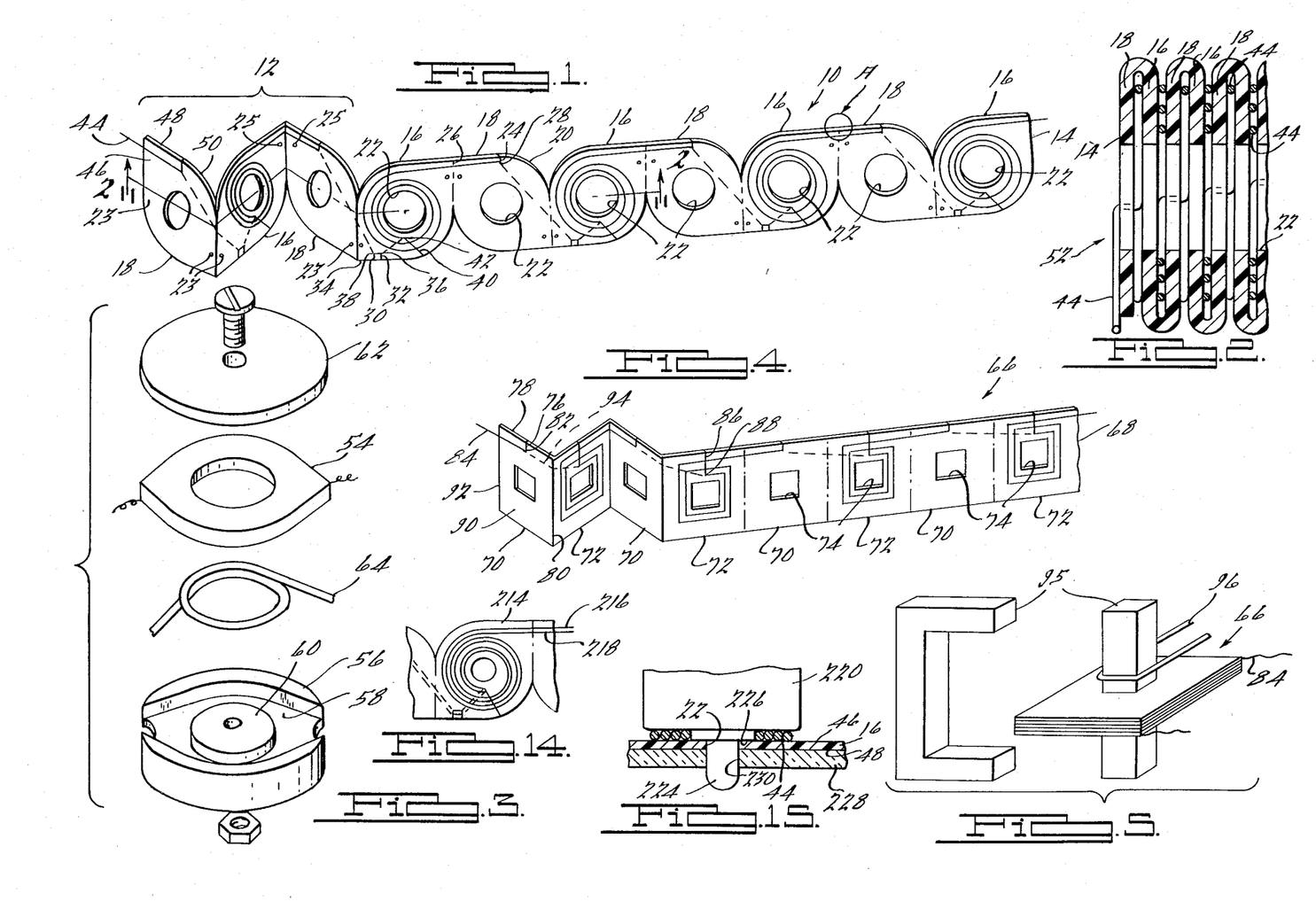
FIG. 1 is a view of a first embodiment of a spiral coil in accordance with the present invention in the form of a strip coil having a portion thereof partially folded.
FIG. 2 is an enlarged cross-sectional view of a portion of the strip coil of FIG. 1 shown in a folded condition prior to impregnation, the section being taken along line 2—2 of FIG. 1.
FIG. 3 is an exploded perspective view illustrating the components of a complete transformer structure employing a strip type secondary coil in accordance with the present invention.
FIG. 4 is a view of another embodiment of the present invention similar to that of FIG. 1.
FIG. 5 is a perspective view of a transformer employing the embodiment of the invention shown in FIG. 4 including a core structure.
FIG. 14 is a view of a portion of another embodiment of a spiral coil similar to that of FIG. 1.
FIG. 15 is an enlarged view of a portion of a substrate shown in relationship to a portion of apparatus adapted for applying the spiral winding thereto.

Substrate 14 has an aperture 22 centrally disposed in each of the segments and adapted to accommodate a core structure forming a magnetic circuit through the center of the completed coil structure. Also, each of the segments 16 and 18 of the substrate may be provided with a pair of small spaced apart apertures 23 and 25 positioned thereon so as to form two transversely extending bores when the substrate is in a folded condition and also avoid interference with the conductor disposed thereon.

As each insulation segment 18 is identical and, likewise, as each winding segment 16 of the substrate 14 is identical to all other insulating and winding segments, only one of each type of segment will be described in detail in order to avoid unnecessary repetition.

Insulating segment 18 has a shallow inwardly extending opening preferably in the form of a slit 24 extending parallel to fold line 26 a predetermined distance into the substrate strip. This slit terminates at a small aperture 28 preferably round in shape so as to prevent further propagation of the slit into the interior of the substrate and of a diameter approximately equal to that of the conductor used in fabricating the coil, as described in greater detail below.

Winding segment 16 has a pair of slightly spaced apart shallow inwardly extending openings preferably in the form of slits 30 and 32 extending into substrate 14 from edge 34 and parallel to fold line 26. Each of these slits terminates at a small aperture 36 and 38, also preferably round, so as to prevent propagation of the slit further into the substrate. Also, these apertures are of a diameter approximately equal to that of the conductor used in fabricating the coil. A third inwardly extending opening also preferably in the form of a slit 40 extends diagonally a substantially greater distance inward from edge 34 of the substrate terminating at a third small aperture 42 adjacent aperture 22. Slit 40 extends diagonally inward so as to increase the distance between the point at which the outermost turn of the spiral coil crosses the slit and the conductor extending from slit 32 through the slit 40, thereby improving the integrity of the insulation system provided by the substrate. Further, the angled slit also aids in the fabrication of the coil as the conductor is less likely to slip out of a diagonally extending slit when commencing to wind the innermost spiral turn as opposed to one extending perpendicular to the lateral edge of the strip. In fabricating the present strip coil, a continuous length of substrate material of an appropriate width may be sequentially or simultaneously punched and slit to form the various apertures and slits thereon as described above.

Once the substrate has been formed to the desired shape, punched and slit, electrical conductor 44 is then applied thereto, as described below. Electrical conductor 44 will normally be a relatively small gauge copper magnet wire coated with a conventional insulating material, such as an enamel composition, and then overcoated with a thermoplastic adhesive composition. Wire, having such an adhesive coating, is commercially available, commonly being used in construction of self-supporting coils in which the adhesive secures adjacent individual turns of a coil into a unitary structure. In constructing a strip coil in accordance with the present invention, excellent results were obtained using twenty turns per spiral of a 38 gauge copper wire, known as "S.Isonel 200 A. V. C. #1" available from Hudson Wire Company. However, any other suitable electrical conductor may be easily substituted therefor.

Electrical conductor 44 is first laid along one side 46 of the substrate up to aperture 28. The wire is then inserted through slit 24 into aperture 28 so as to pass through to the opposite side 50 of the substrate. From this point, the conductor 44 is laid along the back side of the substrate in a generally straight diagonal path across the width of the substrate toward aperture 38 on the adjacent winding segment. The wire is then inserted through slit 30 into aperture 38, laid along side 46 of the substrate in a direct line toward aperture 36 into which it is inserted through the access afforded by slit 32. The conductor then is again laid along the side 50 of the substrate in a generally diagonal path toward aperture 42 into which it is inserted through slit 40. Next, the conductor is applied to the substrate in a clockwise direction spirally outwardly around aperture 22. When a sufficient number of turns have thus been applied to the substrate such that the outer edge of the spiral is spaced from the edge of the substrate a distance equal to or preferably slightly less than that which aperture 28 is spaced from edge 48, the conductor is laid in a straight line across the winding segment and the next adjacent insulating segment until it reaches aperture 28. It is desirable to position aperture 28 slightly closer to edge 48 than the outermost turn of the spiral coil so as to cause the electrical conductor to taper slightly outward as it progresses toward aperture 28. The identical process is then repeated for the next and subsequent alternating insulating and winding segments. The strip may be thus constructed until the desired number of winding segments have been obtained. Alternatively, a continuous ribbon comprising multiple pairs of alternating insulating and winding segments may be fabricated in this manner with the finished ribbon being coiled for storage upon a reel and thus available for subsequent use in fabricating any desired size and number of coils. Also, should it be desirable, the coils may be spiralled outward in a counterclockwise direction or even alternating directions on successive winding segments of the substrate.

In any event, once the desired number of segments has been obtained, the strip is then folded along fold lines 26 accordion style. As shown in FIG. 1, when the first segment is an insulating segment, it should be folded back or in such a manner that the first fold line will be toward the front and the second toward the back, as viewed therein. It will be noted that when the strip coil is folded in this manner, each of the conductor portions which cross a fold line will be placed in compression at the fold point as opposed to the tensioning created should the conductor be caused to extend across the outer portion of the fold, thereby insuring that the folding process will not cause the conductor to be broken. Also, in this manner, the conductor is covered by a layer of the insulating substrate at the fold line rather than being exposed to potential abrasion or otherwise being caused to short out or open circuit a portion of the winding.

A completed coil structure 52 is shown in FIG. 2 sectioned along line 2—2 of FIG. 1, wherein like numerals indicate identical portions of the structure. As is readily apparent from this figure, the coil structure as above described, consists of a plurality of winding segments with each segment having multiple layered turns, but only one turn per radial layer. Further, each of the spiral coils is insulated from the others by two layers of the high dielectric substrate, between which the interconnecting portion of the conductor extends.

With reference now to FIG. 3, there is shown a folded and impregnated strip coil secondary winding 54 about to be installed in a high efficiency ferrite "pot" core 56. "Pot" core 56 has a generally circular recessed portion 58 with a raised center spindle 60 in a lower half and has a cover portion 62 adapted to retain the coils in position and, thereby also affording a high degree of magnetic coupling between the core and coils. Primary coil 64 is first inserted in the recessed portion followed by the folded strip coil 54 of the present invention having been fabricated and folded, as described above. Once the core and coils have been assembled, they may thereafter be encapsulated in any suitable resin composition to seal out moisture and dirt, as well as to insulate the magnetic core assembly, if so desired.

It should also be noted that in many cases it will be desirable to impregnate the strip coil secondary winding 54 prior to assembly with a core structure so as to insure proper insulation thereof as well as complete penetration of the impregnating composition. This may be easily accomplished by first loosely folding the completed substrate accordion style as described above, then placing the loosely folded coil structure in a vacuum. Next, the strip coil is immersed in a liquid epoxy composition while still maintaining the vacuum. The vacuum is then released thereby allowing air pressure to force the epoxy material between the loosely folded substrate. Next, the loosely folded substrate is compressed into a compact package thereby forcing out any excess epoxy material and the structure is allowed to cure. This method insures full and complete penetration of the epoxy material while also insuring no air bubbles or other voids remain which may create weak spots in the insulation and eventually result in an internal short circuit. Further, the completed strip coil when thus encapsulated may be easily handled such as for assembly to a core structure without the danger of the coil becoming damaged. Further, the epoxy composition will fill each of the bores defined by the coaxial apertures 23 and 25 thereby forming a rivet-like structure extending completely through the coil assembly to assist in retaining the coil in a properly positioned folded unitary structure thereby allowing a large number of coils to be fabricated and stored prior to assembly to a core structure should this be desirable. Also, improved insulation between the coil structure and the core structure is insured by first impregnating the coil in this manner. The completed assembly may then also be further encapsulated should this be found desirable for a particular intended application.

A second embodiment of the present invention is shown in FIG. 4 indicated generally at 66. In this embodiment, the substrate 68 is comprised of alternating insulating segments 70 and winding segments 72 of a generally square or rectangular shape. A relatively large aperture 74 is centrally disposed in each of the segments to accommodate a core material. While the aperture illustrated in FIG. 4 is rectangular, the shape and size thereof may be adapted to accommodate the shape of any desired core material, or even entirely omitted depending on the desired application. Apertures 74 are located on each of the segments 70 and 72 so as to be aligned when the strip coil is folded. Further, the embodiment of FIG. 4 is distinguished from the embodiment of FIG. 1 in that the interconnecting conductor segments and the openings or slits for accommodating same run along only one edge 78 rather than being led through slits in both edges of the substrate as in FIG. 1.

In the embodiment of FIG. 4, insulating segment 70 has a shallow slit 76 extending inward from the edge 78 of the strip and parallel to fold line 80 a short distance. This slit terminates at a small aperture 82, the size of which is designed to accommodate an electrical conductor 84 used in forming the windings, as hereinafter described. Also, this aperture will preferably be round in shape so as to prevent the slit from propagating further inward during the forming of the coil.

Winding segment 72 also has a slit 86 extending inward from edge 78 a substantially greater distance than slit 76 of the insulating segment. Slit 86 is disposed approximately midway between the fold lines and terminates in an aperture 88 similar to that of aperture 82. Each of the alternating insulating and winding segments are identical in construction to those described above and, therefore, further description thereof is believed unnecessary.

An electrical conductor similar to that described above with reference to FIG. 1, having an insulating coating and a coating of a thermoplastic adhesive composition, is then installed on the above described substrate. The wire is laid along surface 90 running parallel to edge 78 and spaced inward therefrom a distance equal to the depth of slit 76. The conductor then is passed through aperture 82 by inserting it through slit 76 and laid along side 92 of substrate 68 in a generally diagonal line 94 toward aperture 88 of winding segment. At this point, the conductor is inserted through slit 86 into aperture 88 thereby bringing the conductor back to side 90. The conductor is then laid on the winding segment in a rectangular spiral of increasing perimeter until the outer edge of the winding is spaced from the edge of the winding segment a distance equal to or preferably slightly less than the depth of slit 76. The conductor then travels adjacent and slightly toward the edge of the substrate across fold line 80 to aperture 82 on the next succeeding insulating member 70. The same steps are then repeated in the same fashion as described above so as to form a continuous series of alternating insulating segments and winding segments having spiralling coils disposed thereon.

When a desired number of segments has been completed, the substrate is then folded along fold lines 80 accordion style in a manner similar to that described with reference to FIG. 1 making sure that the conductor is placed in compression at each point it crosses in a fold line.

The completed coil assembly may then be installed on a core structure 95, such as is shown in FIG. 5. The rectangular strip coil structure of FIG. 4 is suited for use with a conventional "C"-"I" core structure and may employ either a single turn primary winding 96 similar to that described and illustrated in FIG. 3 or a multiple turn primary winding.

The spiral coil construction of the present invention is ideally suited for use as an ignition coil for spark ignited internal combustion engines in which the coil assembly is intended to be mounted directly on the spark plug and in which the coil is energized by a capacitor discharge which is arranged to fire say 10 times in a 2 millisecond interval for each ignition event or as otherwise required by engine design and operating parameters. Such an embodiment of the present invention is illustrated and described in detail with reference to FIGS. 6 through 10.

Figure 6:
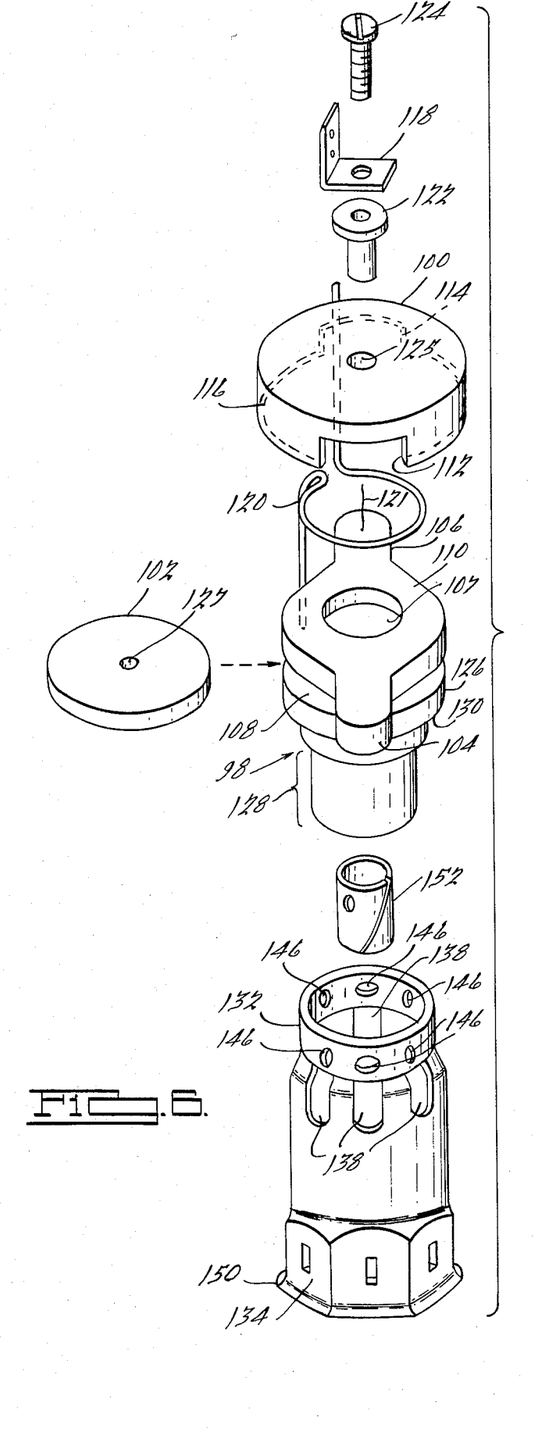
FIG. 6 is an exploded perspective view of a spiral coil of the present invention impregnated and molded in a structure adapted to accommodate a ferrite "pot" core and including associated structural elements for completing an ignition coil designed for attachment to a spark plug.
Figures 7, 11, 12, 13:
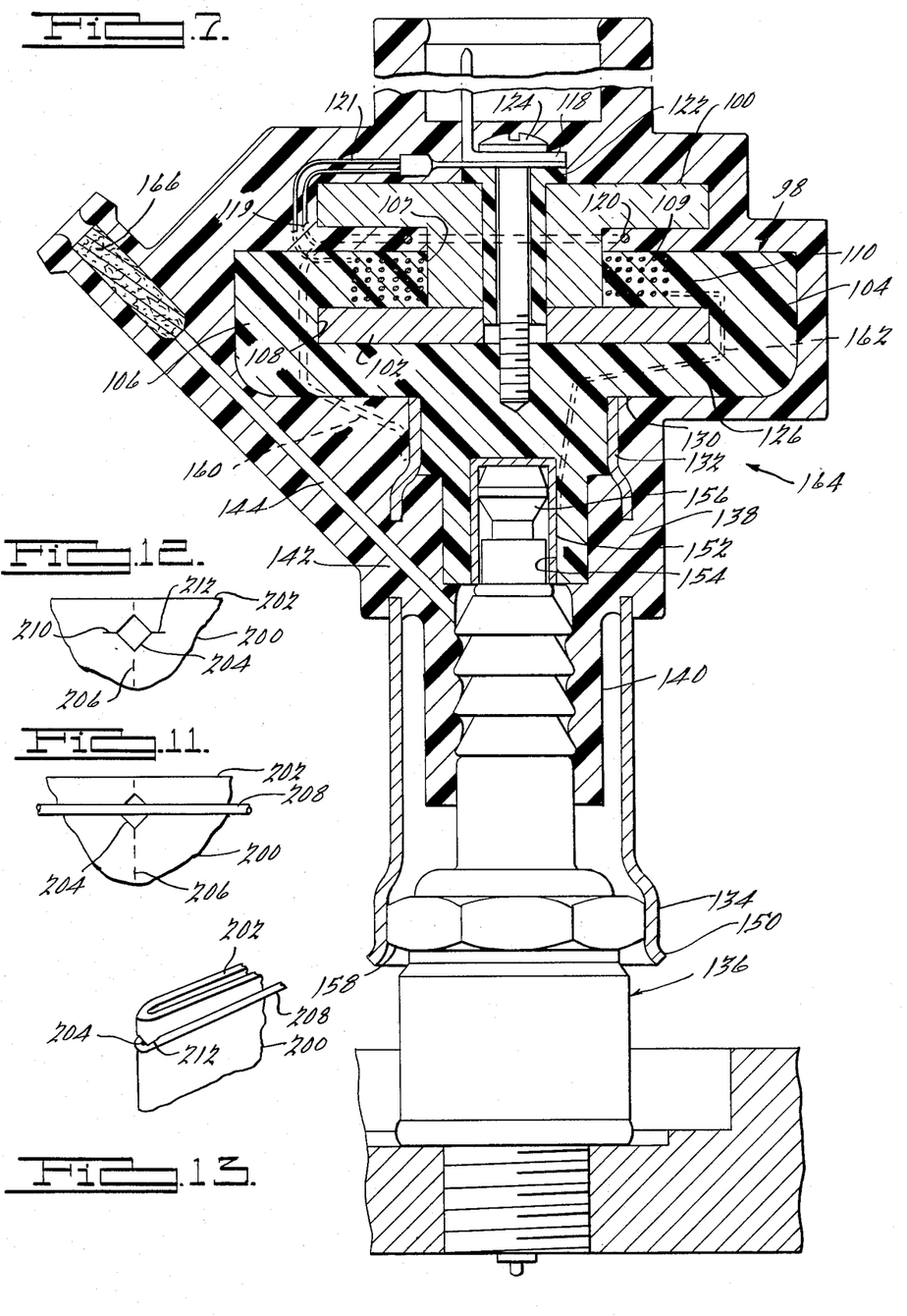
FIG. 7 is a sectionalized view of the assembled and fully impregnated and molded ignition coil assembly of FIG. 6 shown in operative relationship to a spark plug.
FIG. 11 is an enlarged view of the portion of the strip coil of FIG. 1 enclosed within circle A modified to illustrate a means for retaining the conductor when the substrate is folded in such a manner as to have the conductor cross the outside edge of the fold line.
FIG. 12 is a view similar to that of FIG. 11 but omitting the conductor therefrom.
FIG. 13 is a view of the modification of FIGS. 11 and 12 showing a portion of the strip coil in a folded position.

Referring now to FIGS. 6 and 7, there is shown a spiral winding in accordance with the present invention in the form of a strip coil which has been impregnated and enclosed in a bridge type molded structure 98 specifically designed to accommodate a primary winding and ferrite "pot" core structure which includes a main body portion 100 and cover 102. When assembled to the molded structure 98, the ferrite "pot" core will effectively surround all but the laterally extending tab portions 104 and 106 thereof. Molded structure 98 is generally cylindrical in shape and has a slot 108 formed therein for receiving ferrite "pot" core cover 102 and a large centrally located aperture 107 for receiving a center projection of main body portion 100 of the ferrite "pot" core. The strip coil 109 of the present invention is housed in portion 110 surrounding aperture 107 and overlying slot 108 and from which tab portions 104 and 106 extend laterally outward in substantially opposite directions. Main body portion 100 and cover portion 102 of ferrite "pot" core are substantially identical to that of core 56 and cover portion 62 of FIG. 3 being generally cylindrical in shape and having slotted openings 112 and 114 in the circumferential sidewall portion 116 for accommodating tab portions 104 and 106. A blade connector 118, to which one end 119 of a primary winding 120 is electrically connected, is mounted on top of main body portion 100 and electrically insulated therefrom by insulator bushing 122. Lead 121, from secondary strip coil 109, is also electrically connected to blade connector 118. Fastener 124 passes through blade connector 118, insulator bushing 122 which is inserted through aperture 125 and entering aperture 127 provided in ferrite "pot" core, and is threadedly secured within a lower portion 126 of molded structure 98 so as to secure main body portion 100 and cover portion 102 of the ferrite "pot" core together as well as retain blade connector 118 in position.

Molded structure 98 also has a reduced diameter lower portion 128 and shoulder 130 adapted to receive grounding member 132. The configuration of the grounding member 132 can best be appreciated by reference to FIG. 6 in which grounding member 132 is shown prior to assembly. The grounding member 132 is provided with a hexagonal shaped portion 134 which fits over the hex portion of spark plug 136 for electrical grounding engagement therewith. The grounding member 132 also includes a series of openings 138 which provide an interlacing connection between the material of the encapsulating and sealing boot 140 and the grounding member 132. One of these openings, shown at 142, is enlarged to facilitate the placement of the vent passage 144. A series of smaller spaced openings 146 are at the upper end of the grounding member 132 to strengthen an adhesive connection between the grounding member 132 and molded structure 98. The latter are preferably bonded together by an epoxy adhesive or the like which flows through the openings 138 and 146 to the radially outward surface of the grounding member 132. The grounding member 132 preferably has a radially outwardly flared bottom portion 150 which strengthens the structure and guides the placement of the grounding member 132 over the spark plug 136. A high voltage connector 152 is disposed within an aperture 154 provided in the lower end of reduced diameter portion 128 and is adapted to engage and electrically connect the high voltage lead of strip secondary coil to the center terminal 156 of spark plug 136 through lead 162. Grounding member 132 is adapted to fit over and engage a grounded portion 158 of spark plug 136 so as to provide an electrical connection to ground for both primary coil 120 and strip secondary coil 109 by means of lead 160.

The entire assembly comprising grounding member 132, high voltage connector 152, molded structure 98, primary winding 120, ferrite "pot" core main body portion 100 and cover 102, and blade connector 118 are then encapsulated in an elastomeric composition, as is best seen in FIG. 7, so as to form a unitized ignition coil assembly 164 which may be conveniently mounted on and connected to a conventional spark plug. This encapsulated assembly 164 includes a sealing boot portion 140 which surrounds the spark plug so as to insulate against electrical flashover and to effectively seal the high voltage connection 152 against entry of contaminants. Also, a venting passageway 144 which communicates with the interior of this boot portion is provided to allow air to escape when the assembly is installed upon a spark plug. A filter 166 is provided at the outer end of this passageway so as to prevent entry of contaminants and may be in the form of a glass wool saturated with silicone oil.

Figure 8:
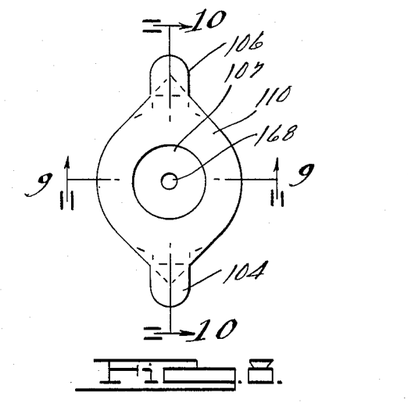
FIG. 8 is a view of the spiral coil molded structure of FIG. 6 as seen from the top thereof.
Figure 9:
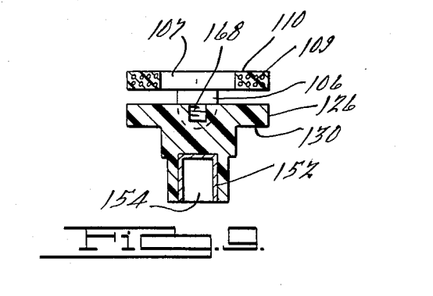
FIG. 9 is a sectioned view of the spiral coil molded structure of FIG. 8, the section being taken along line 9—9 thereof.
Figure 10:
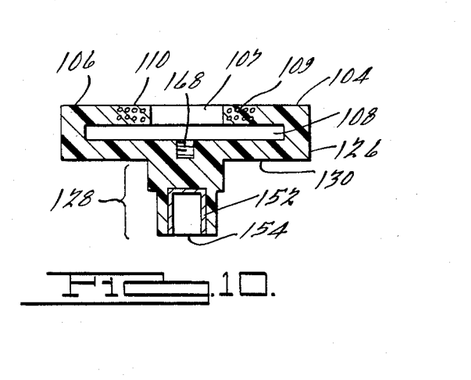
FIG. 10 is another sectioned view of the spiral coil molded structure, the section being taken along line 10—10 of FIG. 8.

Molded structure 98 is best seen and will be described in detail with reference to FIGS. 8 through 10. As seen therein and as previously mentioned, molded structure 98 has a generally cylindrical shape with the upper portion 110 being provided with oppositely radially outwardly extending tab portions 104 and 106. These tab portions allow for a circular slot 108 of substantially the same diameter as upper portion 110 of molded structure 98 to be provided therein so as to receive the ferrite "pot" core cover member 102 as previously mentioned. Strip coil 109 is disposed with the molded structure 98 immediately above slot 108 so as to be encased with the ferrite "pot" core after final assembly. A threaded aperture 168 is provided in portion 126 opening into slot 108 so as to receive and retain screw fastener 124. Molded structure 98 is formed with a reduced diameter portion 128 so as to receive the upper portion of grounding member 132 and also has a generally cylindrical bore 154 provided therein into which high voltage connector 152 is inserted. As is apparent, the above described molded structure 98 provides a fully insulated encapsulation for the strip coil 109 of the present invention as well as serving as a base member to which the above described additional components may be assembled and encloses and insulates all high voltage ignition system conductors so as to form a unitized ignition coil assembly 164 adapted to be mounted upon a spark plug. The use of the strip coil construction as disclosed herein effectively minimizes the space requirements for such a device as well as contributing to weight reduction. It should also be noted that while molded structure 98 has been illustrated in a form adapted to accommodate a spiral coil construction in the form of a strip coil, it may be easily adapted to also accommodate a bobbin type spiral coil construction as is hereinafter described.

An enlarged unfolded portion of substrate 14 of FIG. 1 lying within circle A thereof is shown in FIGS. 11 through 13 incorporating a modification for accommodating a conductor crossing the outside of the fold line. For clarity, the substrate portion shown in FIGS. 11 through 13 will hereafter be designated by the numeral 200. In this embodiment, 202 represents a lateral edge of the substrate 200 and it is intended to fold the substrate along line 206 following the application and adhesion of conductor 208 thereto. In order to minimize the tension exerted on conductor 208 when the substrate 200 is folded and also to securely retain the conductor in position thereon a generally rectangular or square aperture 204 is provided in substrate 200 with first diagonally opposite corners thereof being in line with fold line 206. Shallow slits 210 and 212 are also provided extending outward from the second diagonally opposite corners of aperture 204. Conductor 208 is then applied to substrate with its longitudinal axis approximately in line with slits 210 and 212 as best seen in FIG. 11. As best seen in FIG. 13, during folding, the sides of the square aperture guide the conductor into slits 210 and 212 into which the wire is jammed after folding. This allows some latitude or tolerance in initial placement of the conductor 208. The conductor is mechanically restrained from moving either toward or away from edge 202; further, the conductor is inside the edge of the fold where it may be given still more insulation and mechanical protection by subsequent impregnation.

While the strip coil structure of the present invention has been described with reference to use as an inductive coil, such as for ignition systems, it should be noted that the features set forth above also render this structure particularly well suited for the fabrication of a wide variety of electrical structures requiring a coil assembly. For example, when the strip coil is to be used as an inductive device, it is important that each of the windings be spiralled in the same direction, thereby placing the coil in a series aiding relationship. However, by alternating the direction of the spiral, each of the coils may be placed in series opposition to its adjacent coils, thereby adapting the structure for use in manufacturing non-inductive devices, such as wire wound resistors. For requirements to insulate yet higher volts per turn, the conductor may be wound and laid down bifilar with a strand of insulating monofilament and thus be made to withstand still higher turn-to-turn voltage gradients.

Such an embodiment is illustrated in FIG. 14 in which a single winding segment 214 which is substantially identical to winding segments 16 of FIG. 1. However, in addition to conductor 216 disposed thereon in a substantially identical manner to conductor 44 of FIG. 1, a second strand 218 is interposed along side conductor 216 so as to radially insulate adjacent turns thereof. Strand 218 is preferably an insulating monofilament which may be applied simultaneously with the application of conductor 216; however, any other suitable material having a high dielectric strength may be substituted therefor.

Further, the substrate of the coil assembly is uniquely adapted to facilitate automated commercial production of this coil structure. In the embodiment illustrated in FIG. 1, the substrate strip would be fed from right to left in a horizontal plane from a roll with side 46 upward and the conductor application means located above it. When the aperture 28 on the insulating segment reaches the conductor, slit 24 is opened by bending the substrate on one side of the slit so as to permit hooking the conductor into aperture 28. The applied conductor and substrate would then be rotated 180° in a direction so as to bring side 50 upward. The substrate is then indexed forwardly and the conductor feed moved laterally until the conductor reaches aperture 38 located on the winding segment 16, whereupon the tab portion between slits 30 and 32 is bent upwardly and the conductor is hooked into apertures 38 and 36 by indexing the substrate forwardly. The substrate is then indexed through to aperture 42 on the winding segment where the conductor is hooked into slit 40 and tensioned into aperture 42. The substrate is again rotated by 180° in the same direction as previously to again bring side 46 upward.

Referring now to FIG. 15, to wind the spiral a circular Teflon surfaced foot portion 220 of the winding machine is pressed down over the winding segment 16. A pilot protrusion 224 of the foot fills central aperture 22 accurately locating the substrate 14 with respect to the foot 220. Between the periphery of aperture 22 and the radial location of aperture 42 from the center of aperture 22, a circular land 226 on the foot bears firmly against the substrate. The outside diameter of this land establishes the minor diameter of the spiral and the radial dimension of the land establishes an insulating margin about aperture 22 providing a safe distance for the conductor from the magnetic core portion which is subsequently to be inserted into aperture 22. Outwardly of land 226, the foot has clearance with the substrate of a dimension slightly greater than the conductor 44 diameter. Into this clearance annulus the spiral is wound feeding the conductor from the end of a tubular flyer (not shown) which traverses a circular path about the foot and close to surface 46 of the substrate. Such tubular flyers are well known in the winding machine art.

The conductor must be adhered to the substrate before raising the foot and proceeding. One method which has been successful in doing this is by application of heat which melts the thermoplastic with which the conductor has previously been coated. The molten thermoplastic wets the substrate producing adhesion upon cooling; there is no adhesion, however, to the Teflon surfaced foot.

For speedy commercial production, it is important that this heating and cooling be accomplished rapidly. The side 48 of the substrate opposite the foot is supported by a transparent machine part 228 which may be made of Pyrex glass. This transparent part has a hole 230 the same diameter as substrate aperture 22; this hole also receives the pilot protrusion 224 of the foot, locating and firmly holding the substrate against the transparent surface. A quartz iodine lamp and reflector, (not shown) as is well known, may be used to produce an intense focused beam of infrared energy. Such a beam of infrared energy is briefly directed upwardly through the transparent member 228 heating the substrate and the conductor spiral which then quickly cool by virtue of contact with the transparent member and the foot.

The foot may then be raised and the substrate traversed until the next aperture 28 reaches the conductor. The steps described above are then repeated.

Note that the substrate ribbon of FIG. 1 carries slits on both edges through which the conductor is led. In winding each complete cycle, the ribbon must be rotated one revolution with respect to the conductor supply as in the two 180° rotations described above.

In contrast, the substrate of FIG. 4 carries slits along only one edge and it is not necessary to rotate the substrate with respect to the conductor supply. Therefore, the winding process for the configuration of FIG. 4 is somewhat less complex than that for the configuration of FIG. 1 but is otherwise similar and will not be described.

In order to promote the adhesion of the thermoplastic material to the substrate, it may be desirable to etch the surface of the substrate, particularly should a Mylar type material be used. In some applications, prior to folding the wound substrate of FIG. 1 or FIG. 4, it may be desirable to laminate an additional strip of plastic film to one or both sides. An alternative to the above described epoxy impregnation which may find application with this invention is a film type adhesive either of the thermoplastic type or an epoxy, silicone or diallylphthalate type formed by the process commonly called "prepregging"; a film of such material may be placed adjacent both sides of the wound substrate prior to folding and the three folded together. The film adhesive may then be activated by heat, under pressure and in vacuum as may be accomplished in a spring loaded fixture in a vacuum oven.

Another embodiment of a spiral coil construction in accordance with the present invention is illustrated in FIGS. 16 through 24 and comprises a bobbin support structure 250 upon which the spiral coils are wound which is installed in operative relationship to a ferrite "pot" core structure 252. The bobbin support structure is generally cylindrical in shape and is comprised of a plurality of transition disc members 254 and winding disc members 256 arranged in coaxial nested alternating relationship so as to form a plurality of radially inwardly extending annular recesses 258 and alternating semilunar shaped transition recesses 260. Disc members 254 and 256 will be described in greater detail with reference to FIGS. 19 through 24 below. A secondary conductor 262 has a plurality of outwardly spiralling coaxial turns disposed within recesses 258 and passes through a shallow radially inwardly extending axial slot 321 provided in disc member 256 into semilunar recesses 260 within which it traverses from the major spiral coil diameter to the minor diameter of the next adjacent spiral coil.

Figures 16, 17, 18, 19, 20, 21, 22, 23, 24:
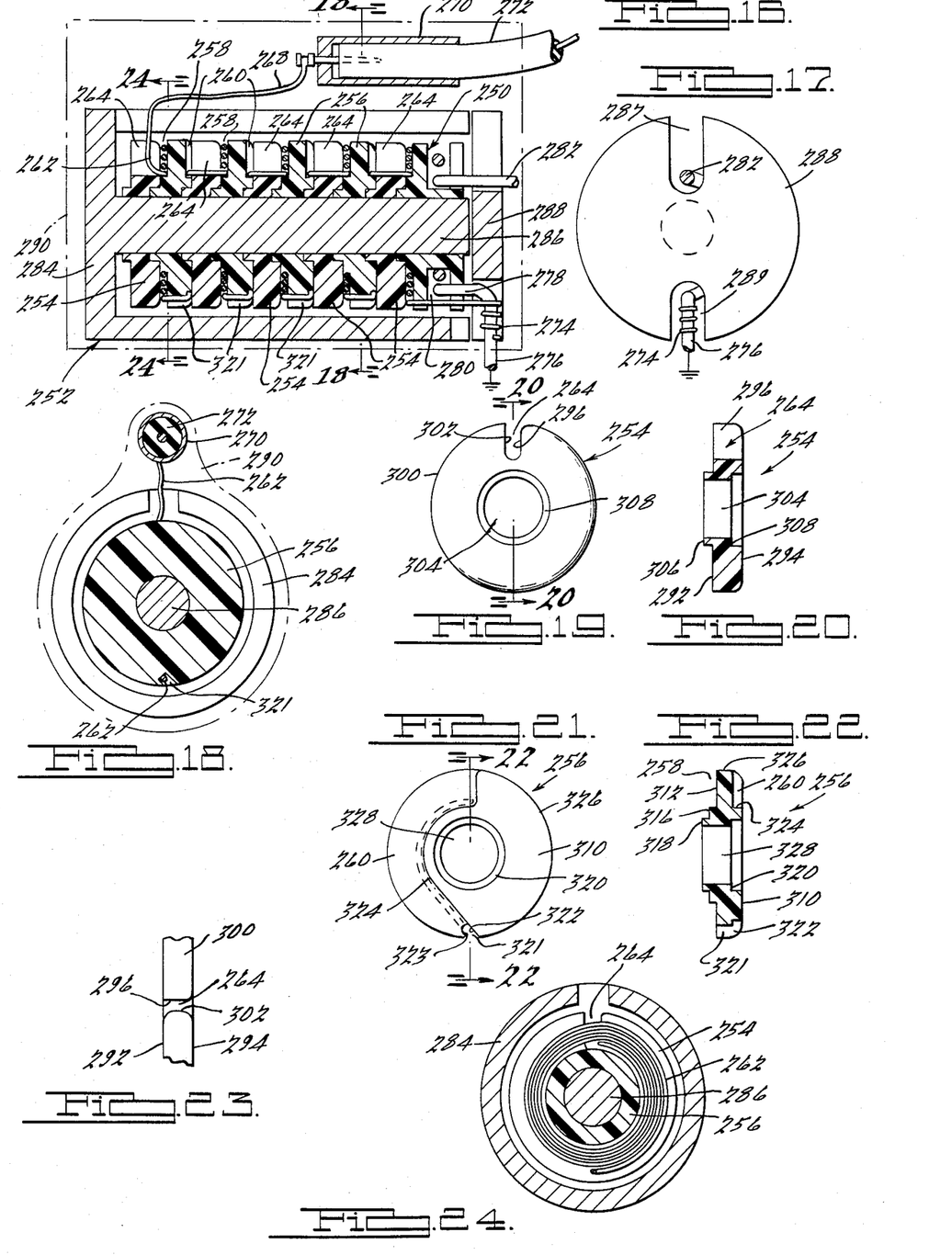
FIG. 16 is a sectioned view of a spiral coil construction in accordance with the present invention, shown in relationship to a core structure, the coil being wound upon a bobbin support structure.
FIG. 17 is an end view of the core structure of FIG. 16.
FIG. 18 is a view of the core and coil structure of FIG. 16, sectioned along line 18—18 thereof.
FIG. 19 is a view of one of the transition washerlike elements employed in fabricating the bobbin structure shown in FIG. 16.
FIG. 20 is a view of the transition washer element of FIG. 19 sectioned along line 20—20 thereof.
FIG. 21 is a view of one of the winding washerlike elements employed in fabricating the bobbin structure of FIG. 16.
FIG. 22 is a view of the winding washer element of FIG. 21 sectioned along line 22—22 thereof.
FIG. 23 is an enlarged detail edge view of a portion of the winding washer-like element of FIG. 21.
FIG. 24 is another view of the core and coil structure of FIG. 16 sectioned along line 24—24 thereof.

A relatively deep radially inwardly extending axial slot 264 is provided in each transition disc member 254 through which the conductor passes to the next adjacent annular recess 256. One end 268 of secondary conductor 262 is connected to a conventional high-voltage terminal 270 which is adapted to have a high voltage conductor 272 connected thereto the other end of which may be connected to a conventional spark plug. The other end 274 of secondary conductor 262 is connected to ground along with one end 276 of a primary conductor 278. Primary conductor 287 has at least one or more turns disposed in recess 280 of bobbin 250 and the other end 282 is adapted to be connected to a conventional capacitor discharge system for receiving electrical pulses thereby inducing voltage pulses in secondary windings 262 through the magnetically coupling ferrite "pot" core structure 252.

Ferrite "pot" core 252 is comprised of a generally cylindrical shaped housing 284 open at one end and having an elongated center post 286 upon which bobbin support structure 250 is placed. The open end of housing 284 is closed by a cover member 288 having a pair of diametrically opposed radially inwardly extending slots 287 and 289 therein which enable the primary conductor ends 276 and 282 to enter and exit from the bobbin structure as is best seen in FIG. 17. Cover member 288 may be secured to housing 284 in any suitable manner desired. If desired, the entire assembly of core structure 252 and bobbin support structure 250 along with primary windings 287 and secondary windings 262 including high voltage terminal 270 may be encased in a suitable epoxy material (indicated by broken line 290) thereby forming a unitized structure.

A typical transition disc member 254 is best seen and will be described in detail with reference to FIGS. 19 and 20. As shown therein, transition disc member 254 is generally cylindrical in shape and is provided with a relatively deep radially inwardly extending axial slot 264 which is adapted to allow the secondary conductor 262 to pass therethrough from side 292 to 294. As illustrated in FIG. 19, transition disc member 254 is adapted to be rotated in a clockwise direction when assembled to bobbin structure 250 for winding secondary conductor 262 thereon. Accordingly, leading edge 296 of recess 264 is provided with a smooth radius at its juncture with the outer circumference 300 thereof while the trailing edge 32 is provided with a sharp edge at its juncture with circumference 300. The radius on leading edge 296 cooperates with the sharp trailing edge 302 to enable the secondary conductor 262 to be easily hooked and slipped into recess 264. Also, as seen in FIG. 20, circumference 300 is provided with a radius at its juncture with radial side surface 294. As best seen in FIG. 20, transition disc member 254 has an axial bore 304 extending therethrough which enables it to be assembled to center post 286 of housing 284. Surface 292 has a raised annular portion 306 facing radially outward which is adapted to be received in an annular recess provided the adjacent winding disc member 256 as described below. Also, an annular recess 308 is provided on surface 294 for receiving a projection of an adjacent winding disc member similar to that of projection 306.

Winding disc member 256 is best seen and will be described in detail with reference to FIGS. 21 and 22. Winding disc member 256 is also generally cylindrical in shape having opposite facing surfaces 310 and 312. Surface 310 has a generally semilunar recessed portion 260 of a shape generally as shown in FIG. 21. Surface 312 has a pair of radially spaced raised annular projections 316 and 318, projections 316 being adapted to engage surface 294 of disc member 254 so as to define annular recess 258 and projection 318 being adapted to be received in recess 308 of adjacent disc member 254. Similarly surface 310 has an annular recess 320 which receives raised portion 306 of disc member 254. A radially inwardly extending slot 321 is provided on disc member 256 defined by leading edge 322 and trailing edge 323 and is adapted to allow secondary conductor 262 to pass from surface 312 to surface 310. Once secondary conductor 262 has passed through slot 321 it will be laid along shoulder 324 joining recess 260 with surface 310 and traverse circumferentially and radially inwardly through approximately 180° thereby bringing it into alignment with slot 264 of the next adjacent transition disc member 254. The secondary conductor 262 is then passed through slot 264 into the next adjacent recess 258 wherein the next spiral winding is formed. Disc member 256 also has a radius provided at the juncture of circumference 326 and surface 310 which aid the entry of secondary conductor into recess 260. Also, an axial bore 328 is provided therethrough.

As both sots 264 and 321 appear identical when viewed in a plane tangent to the circumference of the respective disc members at the point of intersection of the slots therewith, only one such slot 264 is shown as viewed from this position in FIG. 23 and will be described in detail. Numbers in parenthesis indicate corresponding elements of disc member 256. As seen therein, both edges 296 (323) and 302 (322) are provided with a smooth radius at their respective junctures with surface 294 (310) while only edge 296 (323) is provided with a radius at its juncture with surface 292 (314).

As seen in FIG. 24, secondary conductor 262 will be brought into each recess 258 through slot 264 and wound around an assembled bobbin so as to form outwardly spiralling coils therein. The outer end will be passed through slot 321 into recess 260 to traverse circumferentially and radially inward to the minor diameter of the next adjacent spiral coil. Each of the recesses 258 and 260 as well as slots 264 and 321 will preferably have a width equal to or only slightly larger than the diameter of secondary conductor 262. Further, slot 264 will be of a depth to place secondary conductor 262 at the radially inner position within recess 258 while slot 321 will be of a depth equal to the distance between the outer edge of the spiral winding and the circumference of the disc member plus the diameter of secondary conductor 262. Also, the radius provided at the juncture of the circumference of each disc with the side surfaces (294 and 310 respectively) aids in guiding secondary conductor 262 into the respective recesses by allowing the wire strand to be fed from a position shifted slightly toward this radius thereby avoiding possible entanglement with the slot of the next disc member.

Thus, the bobbin support member 250 provides a form whereby the spiral coil construction of the present invention may be easily and rapidly fabricated on a conventional coil winding machine capable of producing relative rotation between the conductor and bobbin structure.

While it will be apparent that the preferred embodiments of the invention disclosed fully provide the features and advantages above stated, it will be appreciated that the invention is susceptible to modification, variation, and change without departing from the proper scope or fair meaning of the subjoined claims.

I claim:

1. A coil construction comprising:
   an elongated flexible substrate having a high dielectric strength;
   a single continuous electrically-conductive wire having an insulating coating thereon being wound without severances or splices so as to form a plurality of spaced apart spiral coils on one side of said substrate;
   said wire having interconnecting portions extending between said spaced apart spiral coils, said interconnecting portions being disposed, at least in part, on another side of said substrate; and
   said substrate having a slit provided therein, said slit extending inwardly from an outer edge portion of said substrate and being operative to allow said wire to pass through said substrate between said one side of said substrate and said another side of said substrate whereby said wire will be spaced inwardly from said edge portion as it extends between said one side and said another side of said substrate.

2. A coil construction as set forth in claim 1 further comprising means to fixedly secure said wire to at least one side of said substrate.

3. A coil construction as set forth in claim 2 wherein said means to fixedly secure said electrical conductor to said substrate comprise an adhesive coating on said wire.

4. A coil construction in accordance with claim 1 wherein said substrate includes a plurality of spaced apart openings extending inwardly from one or both of the lateral edges of said substrate, said wire passing between said one side of said substrate and said another side of said substrate through said openings.

5. A coil construction as set forth in claim 4 wherein said openings terminate at an aperture at their inner end and said wire is inserted through said opening to said aperture so as to pass between said one side and said another side of said substrate.

6. A coil construction as set forth in claim 1 wherein said substrate is of a flexible plastic composition.

7. A coil construction comprising:
   an elongated substrate having a high dielectric strength;
   a continuous electrical conductor forming a plurality of spaced apart spiral coils on one side of said substrate;
   said electrical conductor having interconnecting portions extending between said spaced apart spiral coils, said interconnecting portions being disposed, at least in part, on another side of said substrate; and
   said substrate being adapted to allow said electrical conductor to pass through said substrate between said one side of said substrate and said another side of said substrate and being folded in such a manner that said spiral coils will be coaxial and a non-coil containing portion of said substrate is placed between each of each spaced apart spiral coils, said substrate forming an insulating layer between adjacent spiral coils.

8. A coil construction as set forth in claim 7 wherein said substrate is folded in such a manner as to place said electrical conductor in compression at each point said conductor crosses a fold line.

9. A coil construction as set forth in claim 1 wherein said plurality of coils are wound in such a manner as to function in a serially additive relationship.

10. A coil construction comprising:
    an elongated substrate having a high dielectric strength;
    a continuous electrical conductor forming a plurality of spaced apart spiral coils on one side of said substrate;
    said electrical conductor having interconnecting portions extending between said spaced apart spiral coils, said interconnecting portions being disposed, at least in part, on another side of said substrate; and said substrate including a plurality of spaced apart openings extending inwardly from one or both of the lateral edges of said substrate, said electrical conductor passing between said one side of said substrate and said another side of said substrate through said openings;

said substrate being folded in such a manner that said spiral coils become coaxial and a non-coil containing portion of said substrate is disposed between each of said spaced apart spiral coils, said substrate forming an insulating layer between adjacent spiral coils, said openings being arranged so as to provide a closed portion of said substrate between adjacent openings thereof.

11. A coil construction comprising:

an elongated one piece flexible substrate having a high dielectric strength, said substrate having a plurality of substantially equally sized alternating winding segments and insulating segments;

a continuous electrically-conductive wire having an insulating coating thereon and being wound so as to form a spiral winding on each of said winding segments, said windings being disposed on one side of said substrate;

said wire having interconnecting portions extending between the outermost turn of one of said spiral coils and the innermost turn of a next adjacent coil, said interconnecting portions being disposed at least in part on said another side of said substrate and extending across said insulating segment;

means fixedly securing at least portions of said wire to said substrate; and said substrate further having openings extending inwardly from the outside lateral edges thereof, said openings being adapted to allow said wire to pass between said one side and said another side of said substrate.

12. A coil construction as set forth in claim 11 wherein said substrate is of a flexible plastic composition.

13. A coil construction as set forth in claim 11 wherein said means securing said wire to said substrate comprises a thermoplastic adhesive composition coating thereon.

14. A coil construction comprising:

an elongated substrate of a flexible plastic composition having a high dielectric strength, said substrate having a plurality of alternating winding segments and insulating segments;

a continuous electrical conductor having an insulating coating thereon forming a spiral winding on each of said winding segments, said windings being disposed on one side of said substrate;

said electrical conductor having interconnecting portions extending between said spiral coils, said interconnecting portions being disposed at least in part on said another side of said substrate;

means fixedly securing at least portions of said electrical conductor to said substrate; and said substrate further having openings extending inwardly from the lateral edges thereof, said openings being adapted to allow said electrical conductor to pass between said one side and said another side of said substrate;

said substrate being folded in such a manner as to place said spiral coils in a coaxial relationship, said winding segments and said insulating segments forming alternating layers.

15. A coil construction as set forth in claim 14 further comprising a plurality of apertures disposed in said substrate, said apertures being coaxial with said spiral coils and adapting said coil construction to accommodate a core member for magnetically coupling said coil.

16. A coil construction as set forth in claim 11 wherein said substrate has an aperture disposed at the inner terminal end of each of said openings.

17. A coil construction as set forth in claim 11 wherein said coil is folded accordion style and impregnated with a resin composition.

18. A coil construction as set forth in claim 14 wherein each of said winding and insulating segments have first and second spaced apart apertures, each of said first apertures being coaxially positioned and each of said second apertures being coaxially positioned when said substrate is folded.

19. A coil construction as set forth in claim 18 wherein said folded substrate is impregnated with a resin composition, said resin filling said first and second apertures so as to form rivets thereby fixedly securing said substrate in a folded position.

* * * * *